(12) United States Patent
Maiocchi

(10) Patent No.: US 6,566,838 B2
(45) Date of Patent: May 20, 2003

(54) FULLY DIGITAL CONTROL AND DRIVE COMBINATION IC WITH ON-BOARD DSP FOR DISK MASS STORAGE DEVICE

(75) Inventor: Giuseppe Maiocchi, Villa Guardia (IT)

(73) Assignee: STMicroelectronics S.r.l., Agrate Brianza (IT)

(*) Notice: Subject to any disclaimer, the term of this patent is extended or adjusted under 35 U.S.C. 154(b) by 226 days.

(21) Appl. No.: 09/812,715

(22) Filed: Mar. 20, 2001

(65) Prior Publication Data

US 2002/0001153 A1 Jan. 3, 2002

(30) Foreign Application Priority Data

Mar. 23, 2000 (EP) ............................................. 00830224

(51) Int. Cl.[7] ................................................ G05B 1/06
(52) U.S. Cl. ......................... 318/652; 318/560; 360/69; 360/73.03
(58) Field of Search ................................ 318/560–652; 360/69–87

(56) References Cited

U.S. PATENT DOCUMENTS

| 5,384,524 A | * | 1/1995 | Romano | ...................... 318/569 |
| 5,420,730 A | * | 5/1995 | Moon et al. | .............. 360/77.08 |
| 5,491,395 A | | 2/1996 | Hutsell et al. | ............... 318/560 |
| 5,936,787 A | | 8/1999 | Ohmi | ....................... 360/73.03 |
| 6,208,280 B1 | * | 3/2001 | Baker et al. | ................. 341/152 |
| 6,285,521 B1 | * | 9/2001 | Hussein | .................... 360/73.03 |
| 6,445,661 B1 | * | 9/2002 | Wu | ............................ 369/59.2 |

* cited by examiner

*Primary Examiner*—Jeffrey Donels
(74) *Attorney, Agent, or Firm*—Allen, Dyer, Doppelt, Milbrath & Gilchrist, P.A.; Lisa K. Jorgenson

(57) ABSTRACT

The device is for driving and controlling a rotation motor and a voice coil motor for a hard disk drive system that includes a disk and an arm carrying a read/write head to be positioned with respect thereto. A duty-cycle control loop including a current sensing circuit is connected to the voice coil motor, and an arm position control loop including a speed detection circuit is also connected to the voice coil motor. The duty-cycle control loop and the arm position control loop are digitally implemented by a DSP as a function of digital data representing a first analog signal generated by the current sensing circuit representative of current conducting in a winding of the voice coil motor, and a second analog signal generated by the speed detection circuit representative of an instant speed of the voice coil motor.

39 Claims, 14 Drawing Sheets

FULLY DIGITAL CONTROL AND DRIVE COMBINATION IC WITH ON-BOARD DSP FOR DISK MASS STORAGE DEVICE

FIELD OF THE INVENTION

The present invention generally relates to mass memory drives with disk type support for data storage, and more particularly, to a combined or monolithically integrated combination device including an on-board digital signal processor (DSP) for driving and controlling a first motor of rotation of the disk and at least a second voice coil motor (VCM) for positioning at least a read/write head.

BACKGROUND OF THE INVENTION

Economy and miniaturization stimulates the realization of integrated devices containing analog circuits, digital drive and control circuits, as well as output power stages for driving a multiphase brushless motor that rotates a disk and at least a second voice coil motor that moves a hinged arm carrying a read/write head. A functional diagram of a combination device for driving and controlling a hard disk drive (HDD) of a personal computer (PC) is depicted in FIG. 1.

The block SMOOTH DRIVE manages the command and the control of a DC motor, which is typically a brushless multiphase motor, such as a three-phase motor, for example. The block VCM DRIVE manages the driving and the control of a voice coil motor (VCM) for positioning the arm carrying the head, the winding of which is represented by the load LOAD.

In the depicted example, the integrated circuit IC includes also a third block, identified as RAMP LOADING that implements a certain algorithm for controlling the speed of the voice coil motor to optimize unloading and loading operations of the swinging arm. The swinging arm carries the head from a parking ramp on which the arm is brought to rest to avoid undesired impacts of the head against the surface of the disk when transporting the apparatus.

More specifically, the block SMOOTH DRIVE contains a register KVAL containing the output value of the control algorithm for the rotation speed of the brushless motor carried out by an external microprocessor. The IC is interfaced to the microprocessor through a suitable interface block SERIAL & CONTROL INTERFACE. The external microprocessor programs a second register called TORQUE OPTIMIZER to optimize the timing of the switching through the different driving phases in synchronization with the angular position of the rotor to ensure maximum efficiency.

A third register called INDUCTIVE SENSING contains the current angular position of the rotor of the motor as estimated by the external microprocessor. Information is used to quicken the start-up of the motor from rest toward the programmed speed. In contrast, the block that drives and control the voice coil motor VCM DRIVE commonly comprises a linear current mode control loop with a related summation stage and analog compensation filter, identified by the block ERR_AMP & FILTER.

Notably, these combination drive and control devices place a significant burden on the external microprocessor for implementing the various functions. A fully digital embodiment of all the functions performed by a combination device of this kind would allow a reduction of the number of operations to be carried out by the external microprocessor. This reduction is further achieved if the integrated circuit would include local digital processing, or even better, a finite state machine provided with banks of input/output registers and a working memory. The finite state machine is usually defined as a digital signal processor (DSP).

The presence in the combination drive IC of a DSP core, having its own program memory, allows variation and adaption of the control system to specific needs of the user and to different HDD systems. This makes drive and control functions faster and reduces the burden on the external system's microprocessor by locally implementing faster control loops.

SUMMARY OF THE INVENTION

A main objective of the present invention is to provide an integrated device including a DSP core for managing and/or actuating a plurality of command and control functions for a multiphase brushless motor for rotation of a disk storage support, and for at least a voice coil motor for positioning at least a read/write head over a rotating disk. Analog circuitry is almost completely eliminated compared to known combination devices. Eliminated analog circuitry includes, for example, the error amplifier and the relative compensation filter of the voice coil motor feedback loop, and analog circuitry supporting interleaved control algorithms implying a certain priority scheme in carrying out the different functions for avoiding conflicts.

According to the present invention, instead of driving the voice coil motor according to the common approach of a linear current mode control by feeding the signal output by an error amplifier and filtering by an analog filter, a power stage including four power devices in a full bridge configuration functioning in a switched mode is employed for driving the voice coil motor. The driving of the bridge stage is done according to a phase shift modulation (PSM) of two driving phases or signals that control the switching of the four power devices.

A first important aspect of the present invention is that the current mode control loop of the voice coil motor, with the exception of the amplifier detecting the current flowing in the winding of the motor, is digitally implemented by using the on-chip digital signal processor for performing the functions of the error amplifier and of a loop filter.

Even the control loop of the angular position of the rotor of the voice coil motor is substantially implemented in a digital form using the on-chip DSP and advantageously sharing part of the functional blocks with the current mode drive control loop. The integrated circuit of the invention includes a serial interface to communicate according to a certain protocol, such as the I2C protocol, for example, with a system's microprocessor.

The invention is more precisely defined in the attached claim 1 and a particularly effective embodiment is defined in dependent claim 2.

BRIEF DESCRIPTION OF THE DRAWINGS

The various aspects and advantages of the invention will become more evident through the following description and by referring to the attached drawings, wherein.

DETAILED DESCRIPTION OF THE PREFERRED EMBODIMENTS

Figure 1:
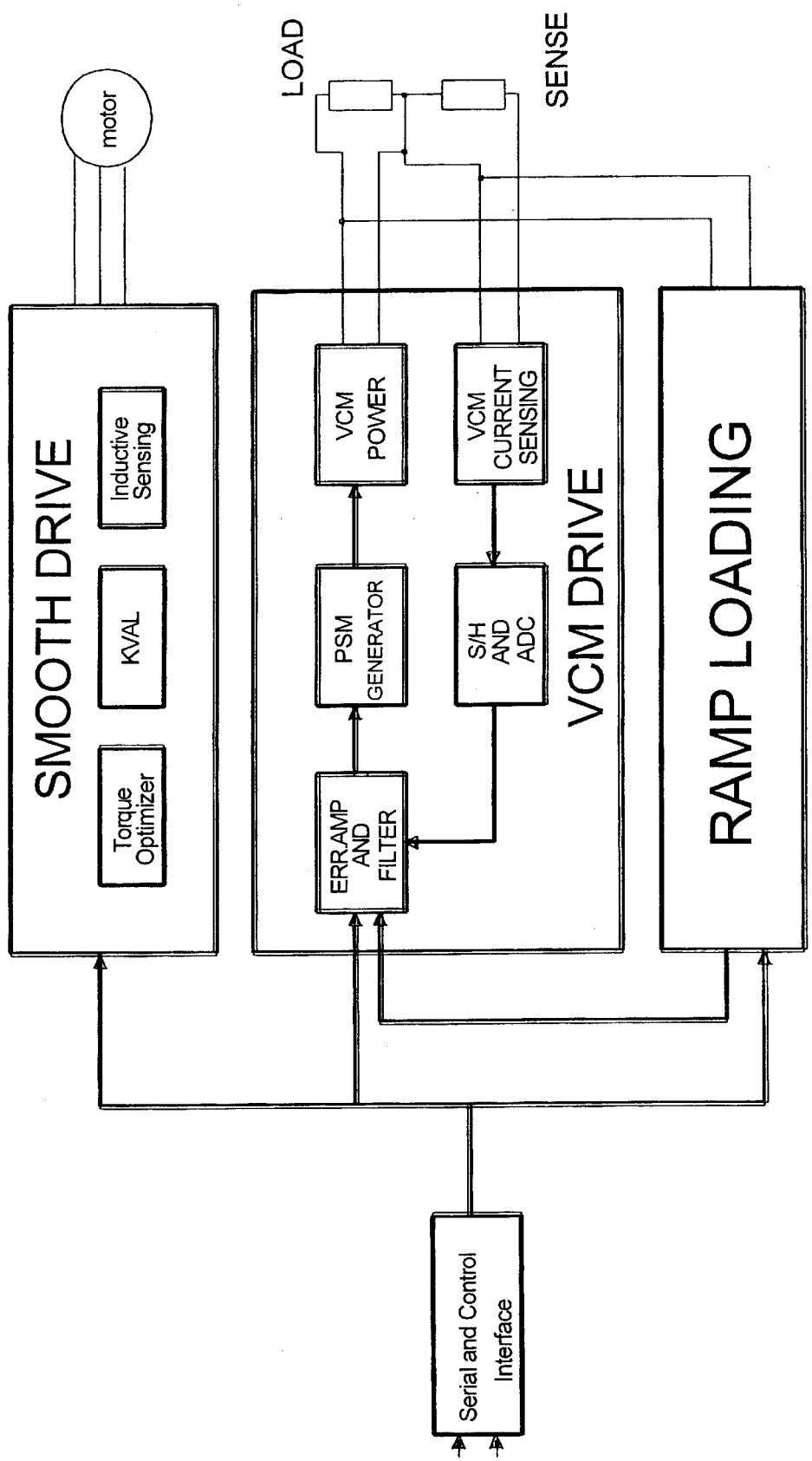
FIG. 1 is a block diagram of an integrated combination device for a hard disk drive (HDD) according to the prior art.
Figure 2A:
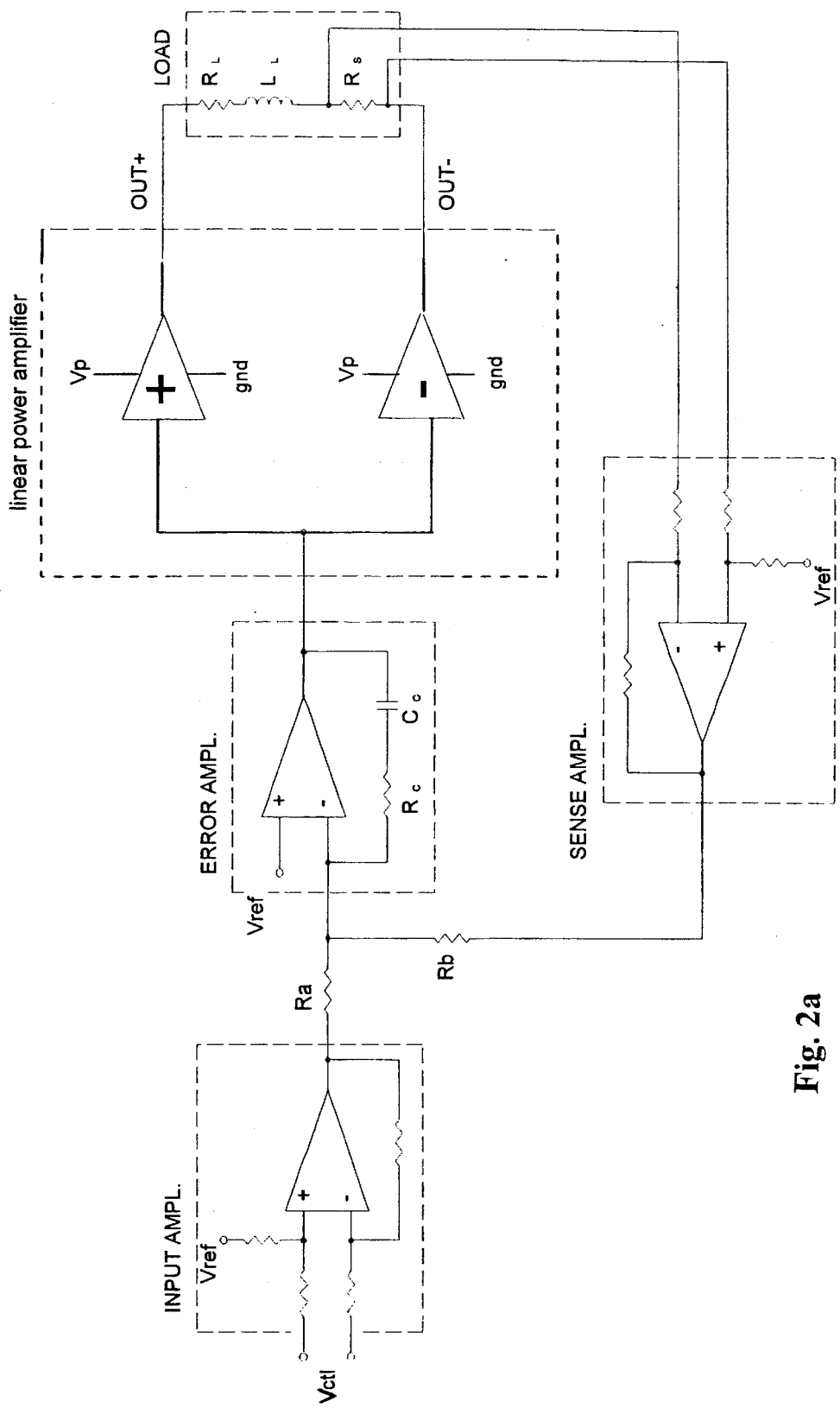
FIG. 2a is a circuit diagram of a common linear control loop for the current flowing in an inductive load according to the prior art.

The requirement of eliminating as much analog circuitry as possible is fulfilled by employing a PWM current control loop instead of a traditional linear current control loop. For example, a typical linear current control circuit of an inductor LOAD, electrically depicted by a resistance $R_L$ and by an inductance $L_L$ connected in series to a current sensing resistance $R_S$ is illustrated in FIG. 2a. The driving of the load is performed by a differential pair of linear power amplifiers, LINEAR POWER AMPLIFIER.

Figure 2B:
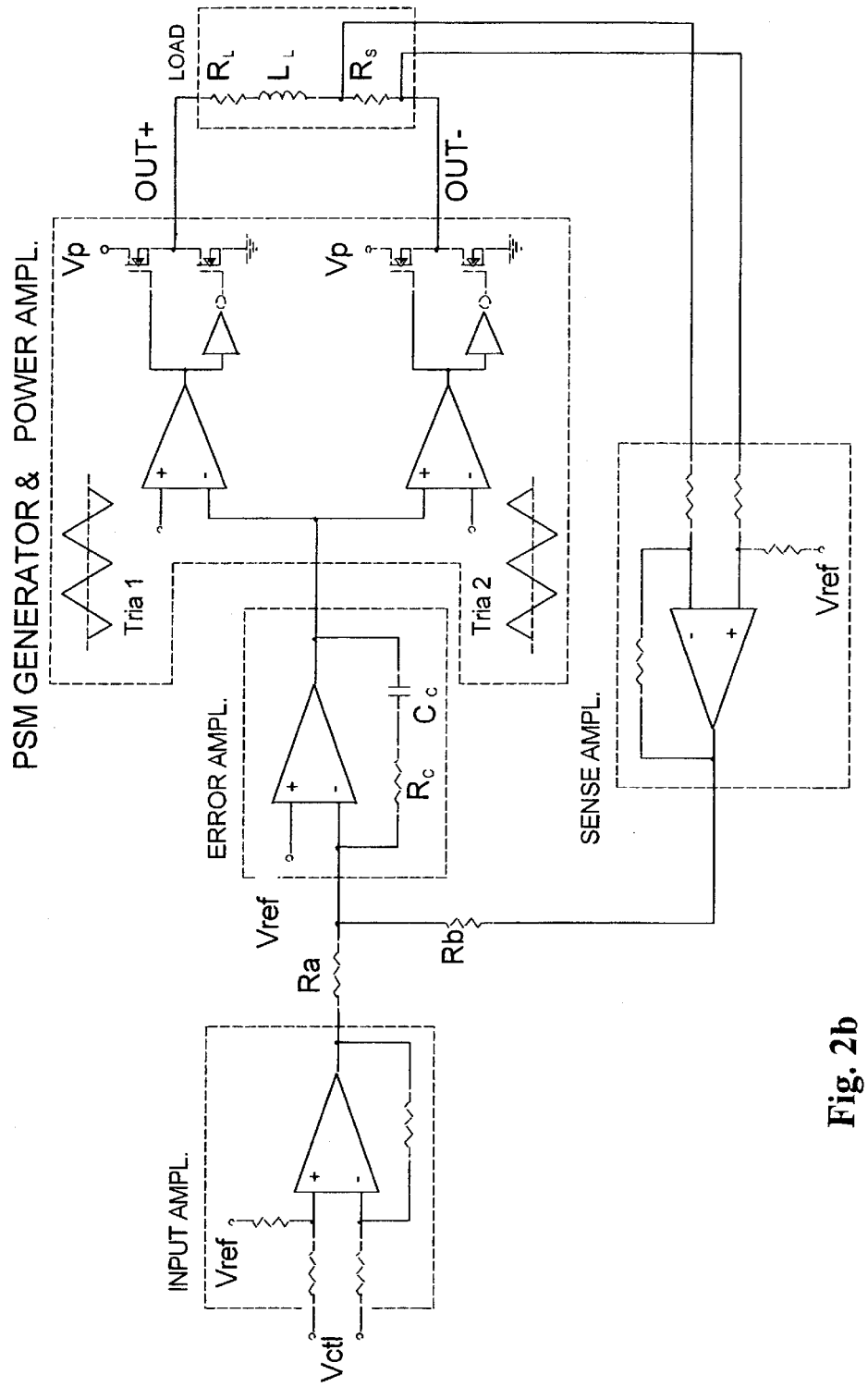
FIG. 2b is a circuit diagram of a switched mode current control loop according to the prior art.

A control loop of the inductive load LOAD representing a voice coil motor in a switched mode or a PWM mode, using four power devices in a bridge configuration, and controlled by respective switching phases is depicted in FIG. 2b. Substantially, the classic linear power amplifier is substituted by the block called PSM GENERATOR&POWER AMPL. The control of the current is exerted as a function of the difference or shift between the phase OUT+ (IN0) and the phase OUT– (IN1) proportionally modifying the duty cycle.

Figure 3:
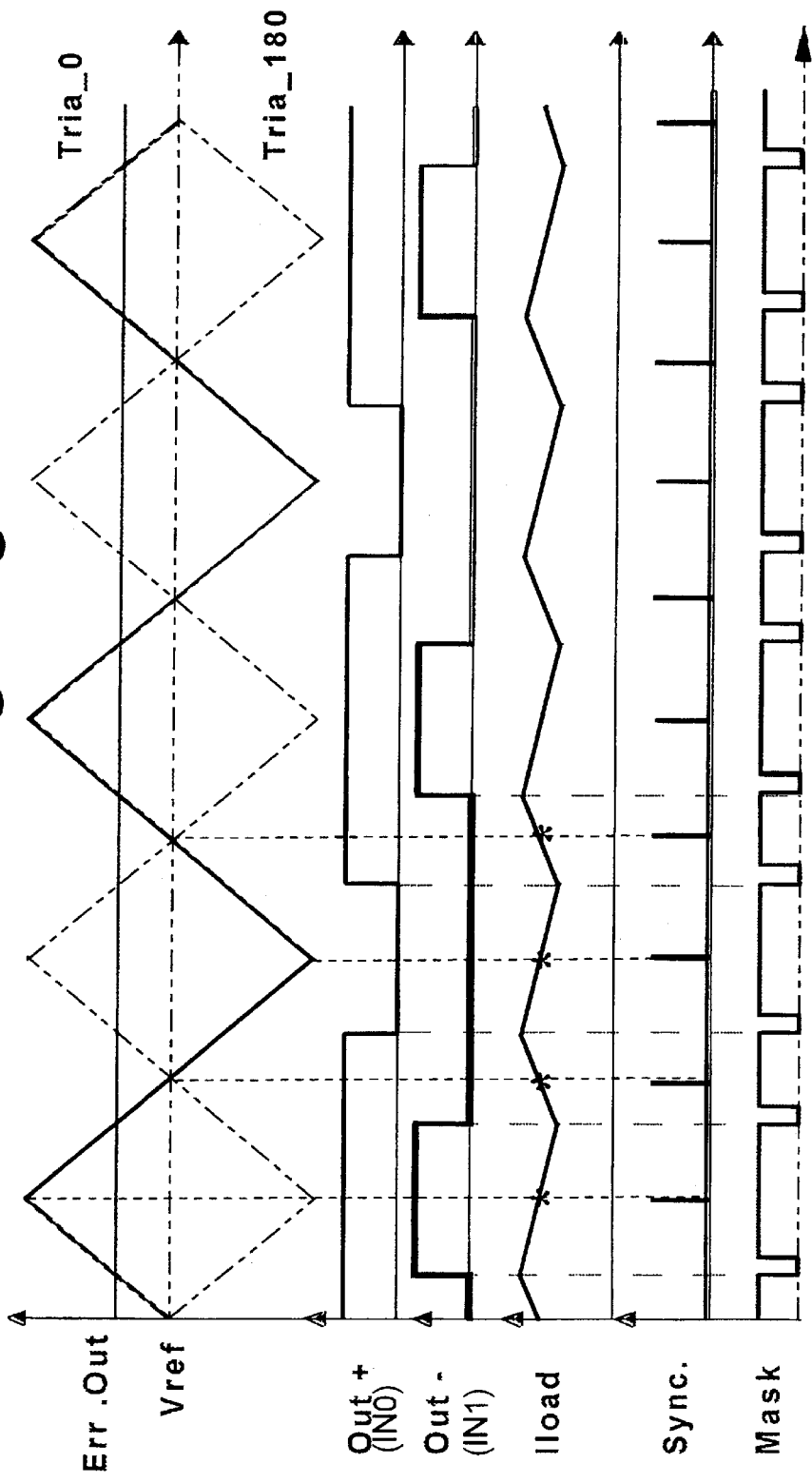
FIG. 3 is a timing diagram illustrating a PSM switched control of an inductive load according to the prior art.

The analog/digital conversion is done by comparing the analog input signal represented by the output Err.Out of the error amplifier ERROR AMPL, with two triangular waves TRIA_0 and TRIA_180, as best illustrated in FIG. 3, by showing the respective control phases of the power switches OUT+ (IN0) and OUT– (IN1). The generation and function of current through the load ILOAD, the synchronization pulses SYNC of the triangular waves and the mask pulses MASK will be described later.

The use of an output stage functioning in a switched mode enhances efficiency because the four MOS power devices function with a relatively small series resistance. However, this approach does not accomplish a significant elimination of the analog circuits because the current control loop still requires several analog blocks. These blocks include the current sense amplifier SENSE AMPL, the error amplifier ERROR AMPL and the input amplifier INPUT AMPL, for example.

Figure 4:
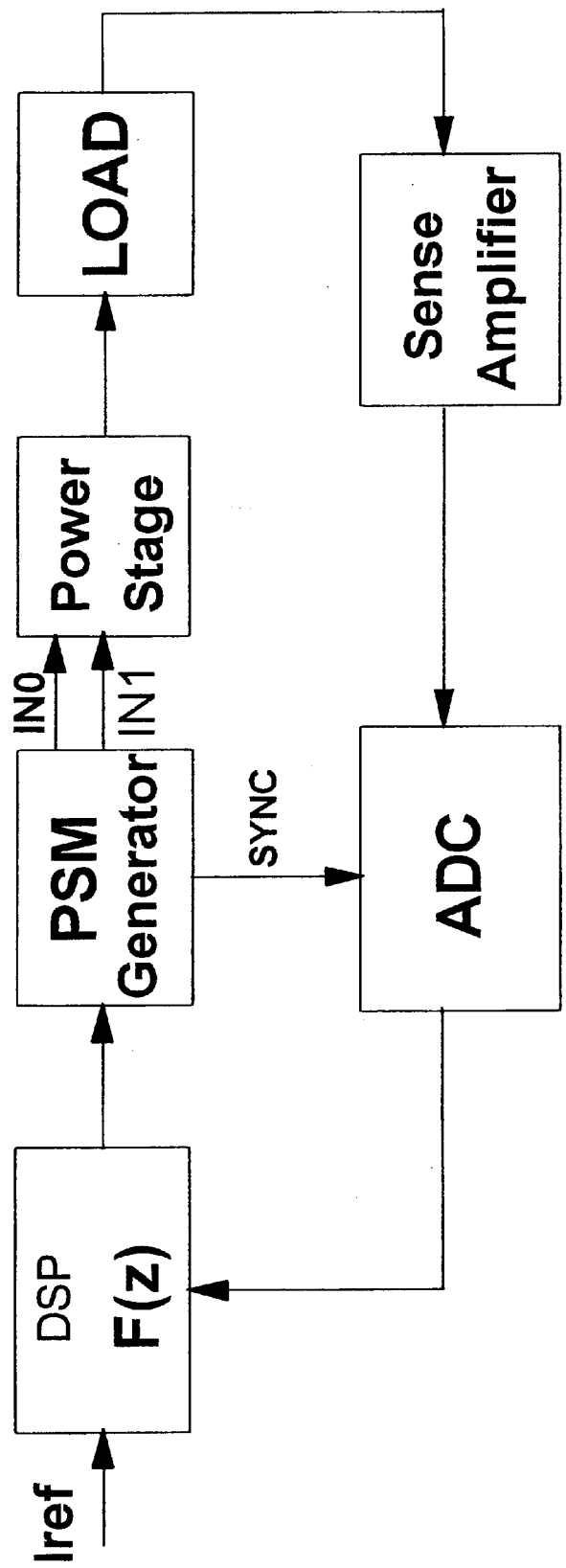
FIG. 4 is a functional block diagram of a switched mode current control loop implemented by the use of an on-chip DSP according to the present invention.

According to a fundamental aspect of the architecture of the present invention, the current control loop of the switched mode output stage of FIG. 2b is implemented by the on-chip DSP. This eliminates all other analog parts apart from the sense amplifier SENSE AMPL, as depicted in FIG. 4. The on board digital signal processor DSP implements the functions of the error amplifier and of the compensation filter of the control loop for the current flowing in the voice coil motor.

The current information provided by the sense amplifier SENSE AMPLIFIER is digitized. The input to the block PSM GENERATOR is no longer analog but digital, and the block PSM GENERATOR is designed to generate two phase modulated signals IN0 and IN1 as a function of the digital input data. Any known circuit converting N-bit data in two phase modulated signals can be used as the block PSM GENERATOR. By way of example, a suitable converting circuit is described in the European Patent Application No. 98830775.7, the entire contents of which are incorporated herein by reference, and which is assigned to the assignee of the present invention.

By referring to the diagram of FIG. 4, the signal produced by the current sensing amplifier, SENSE AMPLIFIER, is sampled by a normal Sample & Hold circuit and converted into N-bit digital data by the block ADC. The sampling of the analog signal produced by the SENSE AMPLIFIER is synchronized with the phase shift modulation frequency, i.e., with the signal generated by the block PSM GENERATOR.

The circuit used to generate the sampling synchronization signal SYNC may be any circuit known for this purposes. A suitable circuit is described in European Patent Application No. 897213, the entire contents of which are incorporated herein by reference, and which is assigned to the assignee of the present invention. The sampling signal is generated every time an up/down counter of the block PSM GENERATOR reaches the smallest or the greatest number.

Figure 5:
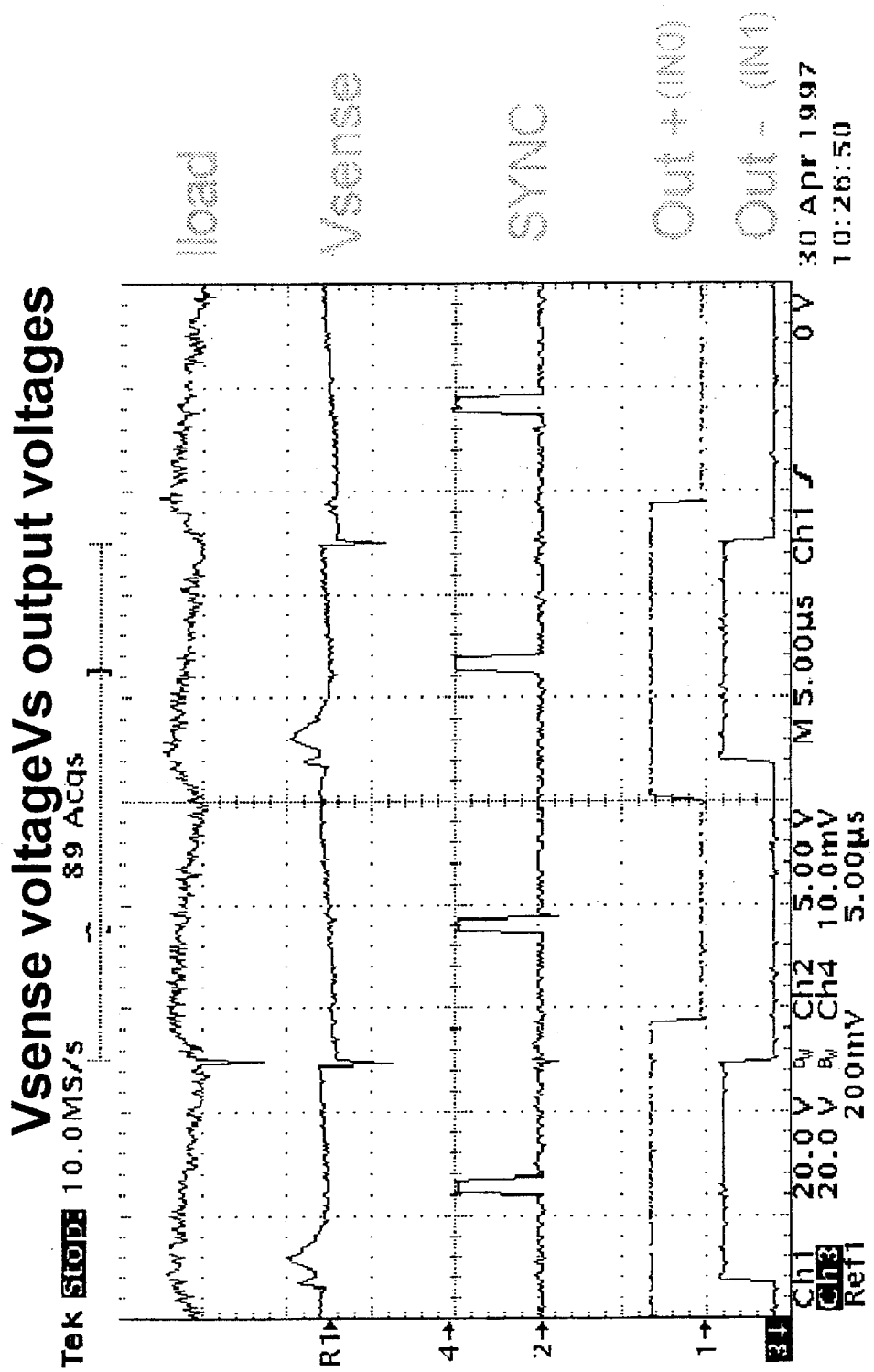
FIG. 5 depicts the control signals of the voice coil motor according to the present invention.

In these conditions, the signal representing the detected current is not influenced by the switching noise, as can be clearly observed from the signal diagrams of FIG. 5. This ensures a stable and effective sampling of the signal representing the current flowing in the winding of the voice coil motor. In other words, the sampling frequency of the current is proportional to the frequency of the driving signal PSM.

This proportionality is very important because by choosing a certain sampling frequency the dynamics of the control loop is determined. Dynamics of the control loop include the following: the bandwidth of the current control loop, the structure and the coefficients of the digital filter of the loop, the time sharing of the DSP for performing out other functions, and the time available to the DSP between two successive current samplings.

Figure 6A:
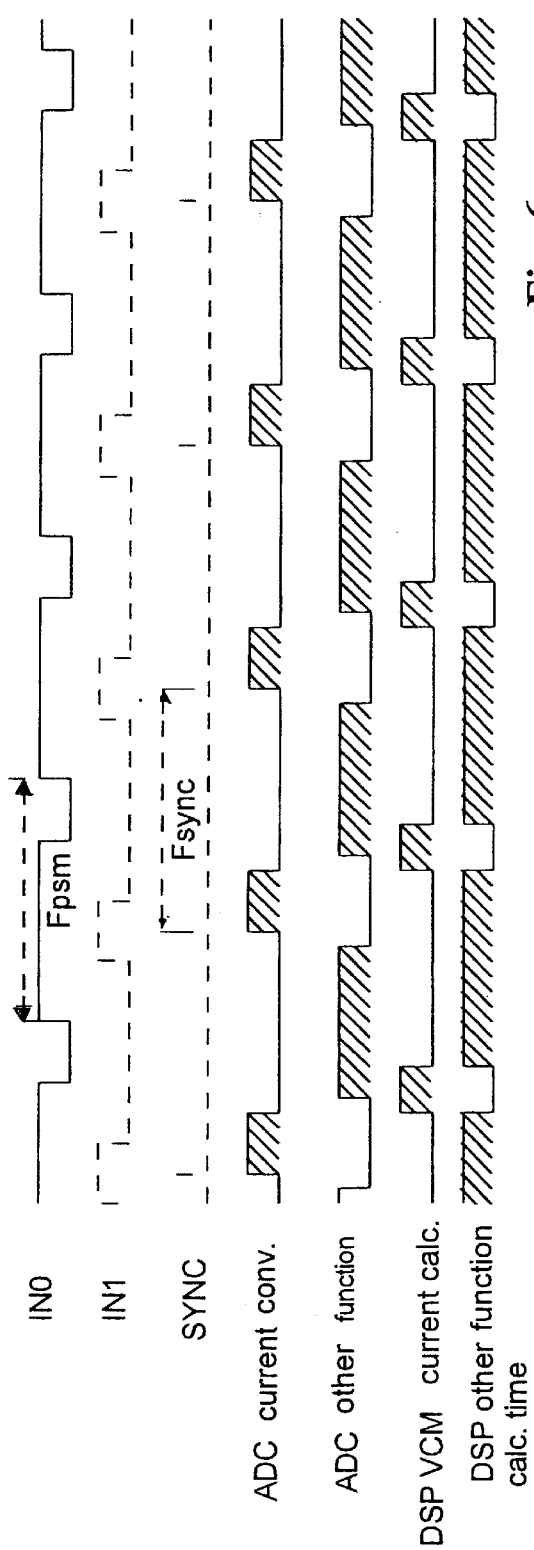
FIGS. 6a and 6b are diagrams showing the interleaved relationship of the control and driving algorithms of the voice coil motor according to the present invention.

As depicted in the diagrams of FIG. 6a, having fixed the frequency FPSM of the two control phases IN0 and IN1 of the output bridge stage that drives the voice coil motor, it is possible to safely establish a sampling frequency FSYNC of the signal by using a sufficiently fast DSP. The sampling frequency FSYNC of the signal is representative of the current flowing in the winding of the motor, i.e., sufficiently far from switching noise. The maximum value of which can be 4*FPSM in case the current is sampled not only at the top or bottom end of the up/down counter embedded in the block PSM CONVERTER, but also at the middle of the counting, as depicted in the diagrams of FIG. 6b.

Figure 6B:
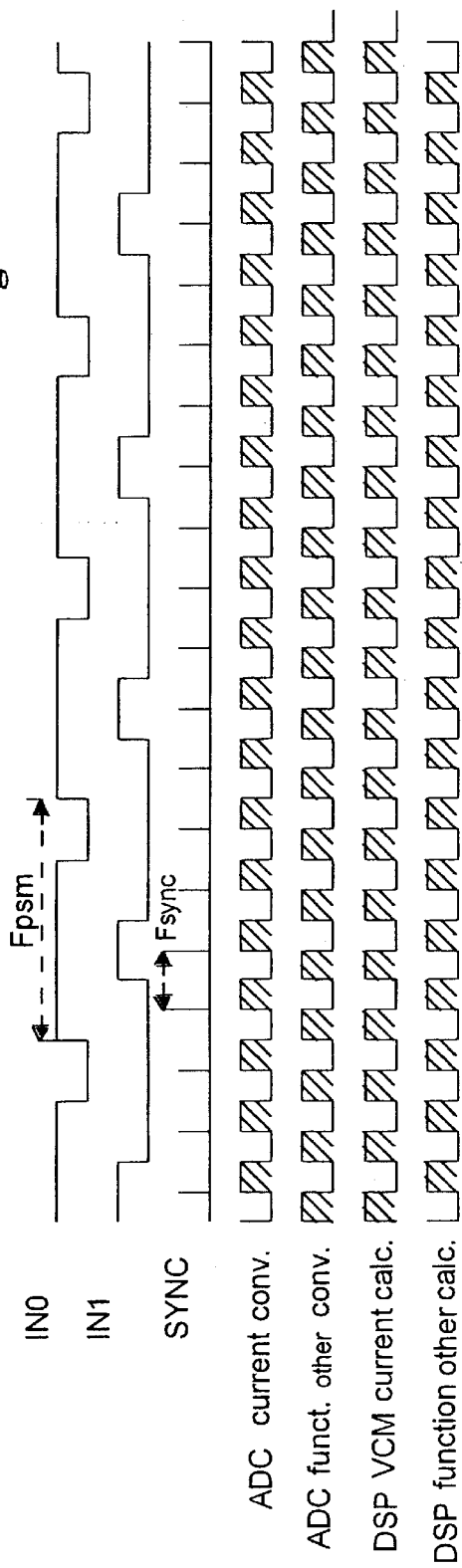

The waveforms of the most important control signals for driving the voice coil motor are depicted in FIGS. 6a and 6b. Looking at the waveforms of FIG. 6b, it can be noticed that between two successive processings, there is a relatively large interval during which the DSP can perform other functions than the main one represented by controlling the current that is forced on the voice coil motor. Indeed, the DSP is able to digitally implement an ample set of digital filters with transfer functions that may contain several poles and zeros, and whose analog embodiment would require complex circuitry.

Normally, the filtering strategies adopted in a current control loop are based on the use of a compensation filter, a zero of which is placed in coincidence of the pole of the motor and on positioning the pole of the filter at a frequency distance of a few hertz. Moreover, a notch filter is often used in series to the current reference signal, thus eliminating the occurrence of mechanical resonances.

By using the DSP as an effective filtering device, even a relatively complex transfer function can be implemented without overburdening computational time and memory resources requisites, while eliminating the need of external RC networks that would be required by an analog implementation of the loop filter.

Figure 7:
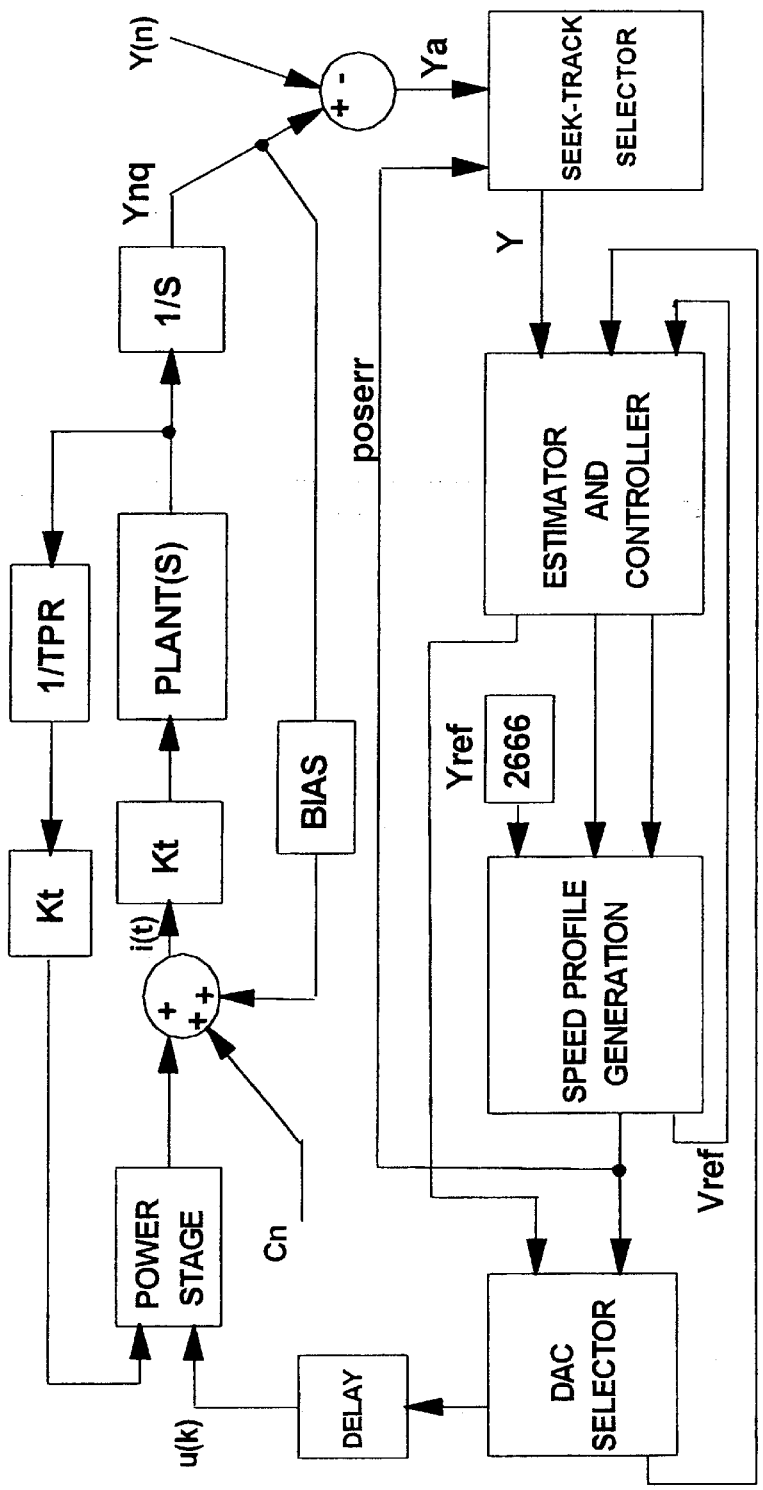
FIG. 7 is a block diagram of the control loop for positioning the rotor of the voice coil motor according to the present invention.

Another function that can be done by the DSP is the seek&track control of the angular position. Often such a control function of the angular position is carried out by the external system's microcontroller or by a dedicated control device. A possible embodiment of the seek&track control function of the position is provided by using the digital signal processor DSP as an estimator and a controller, ESTIMATOR&CONTROLLER, and as a speed profile generator SPEED PROFILE GENERATOR, as depicted in FIG. 7.

Practically, the output of the seek&track algorithm for position control forms the input of the control system for the driving current of the motor. It is possible to use the same DSP processor to carry out both functions in view of the fact that the two control loops must necessarily have different bandwidths. This aspect of the invention, represented substantially by a shared or nested architecture, is depicted in the block diagram of FIG. 8.

The processor DSP is input with the data representing the detected track Ya. Knowing the position of the target track YREF, the DSP produces an actuating signal u(k) corresponding to the reference input digital data of the control loop for the driving current of the motor, i.e., IREF(k).

The DSP must give priority to the current control loop because the current must be regulated in a precise manner and therefore, at each current sample being read, the DSP must run in any case the current control algorithm, thus suspending any other job. It can be said that the algorithm for control of the driving current of the voice coil motor can be considered as a maximum priority NMI routine. Of course, during the time intervals in which the DSP is not busy running the current control algorithm, it is free to run the seek&track algorithm for position control.

Figure 9:
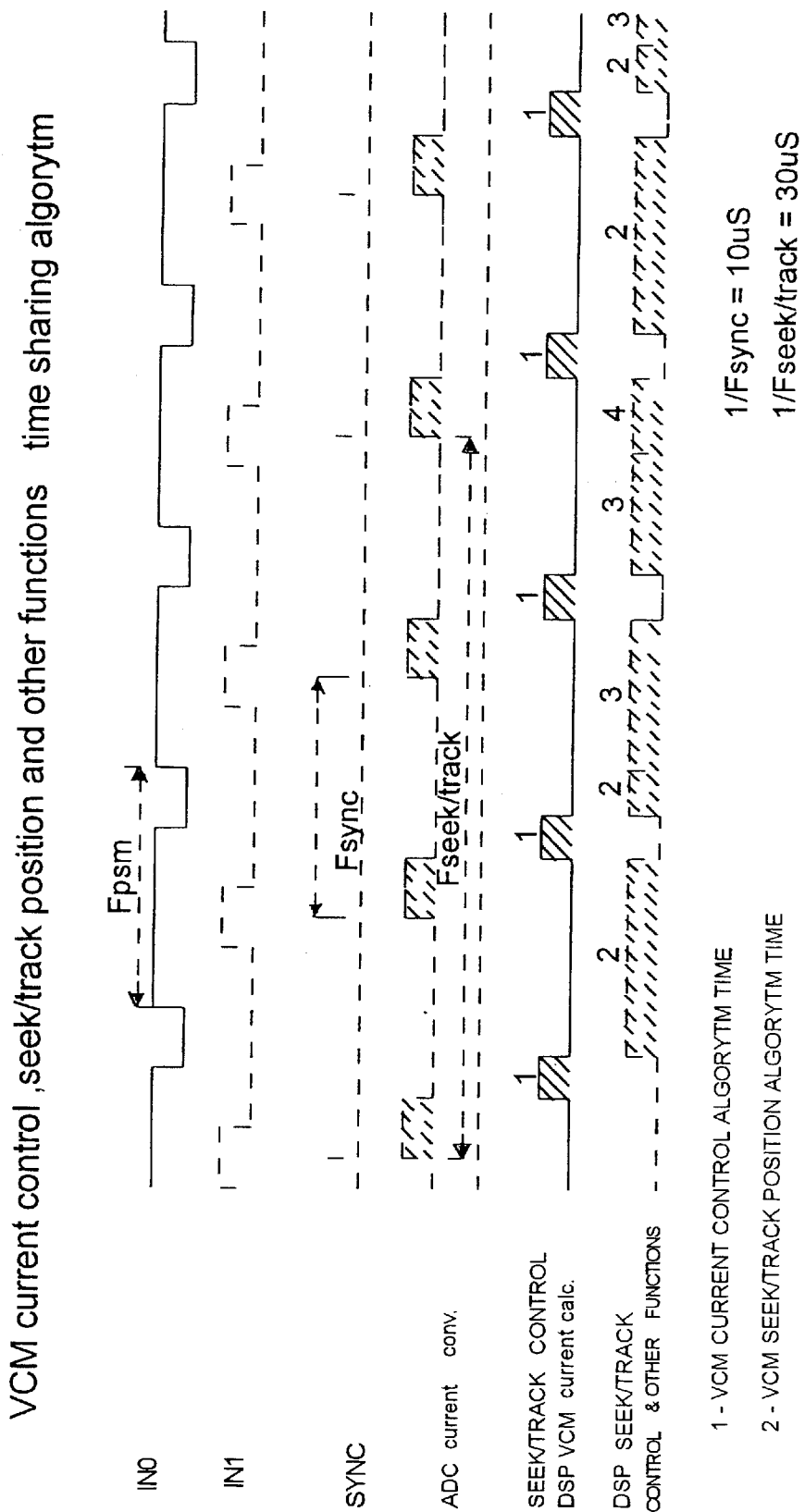
FIG. 9 shows how the different algorithms associated to the execution of functions of relatively higher and lower priority are run based upon an interleaved mode according to the architecture of the IC of the present invention.

The waveforms of FIG. 9 show a condition of operation in which the current control is run at every 10 $\mu$s and the control of the track position is run every 30 $\mu$s, by assuming that the current control algorithm needs a run time of 4 $\mu$s. As may be noted, the current control algorithm starts immediately at every time a new current sample is ready, as produced by the process of analog/digital conversion. Every 30 $\mu$s, the seek&track algorithm for position control is run and, having a lower priority than the current control, will eventually be interrupted upon the production of a new current sample.

As illustrated in FIG. 9, the seek&track algorithm for position control is carried out in two distinct steps, identified by the number 2, and is interrupted by an intervening phase of current control, identified by the number 1. A fast serial interface circuit provides to the integrated device the needed information to carry out a feedback control of the voice coil motor, thus providing for both the detected track position and the target track position.

Figure 8:
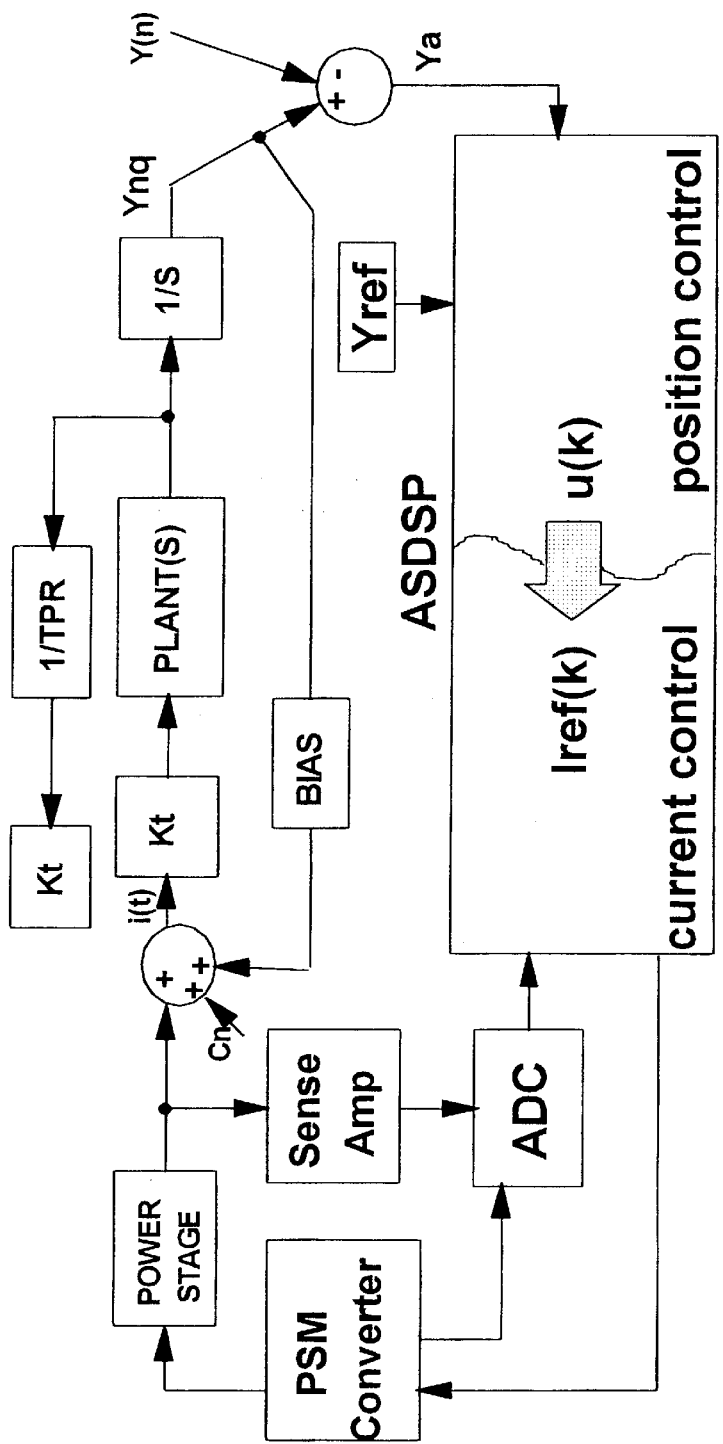
FIG. 8 is a block diagram showing how the DSP implements both the current control loop motor and the control loop of the position of the voice coil motor according to the architecture of the IC of the present invention.

The device of the invention integrates the servo-assisted control of the voice coil motor in the power driving control block, and the digital original processor DSP is exploited in two ways. While operating as servo controller for the arm position, it generates a current position data that is used as the reference data when the DSP acts as a controller of the driving current of the motor, as schematically illustrated in FIG. 8.

Comparably, the regulation of the rotation speed of the brushless motor is a process having a relatively narrow bandwidth, on the order of several hertz, and therefore it is quite acceptable to update the control value of the speed at a relatively slow rate. Moreover, the speed control algorithm can be modeled by a proportional-integral low (PI) control function, and therefore the algorithm needs a relatively short time to run.

Figure 10:
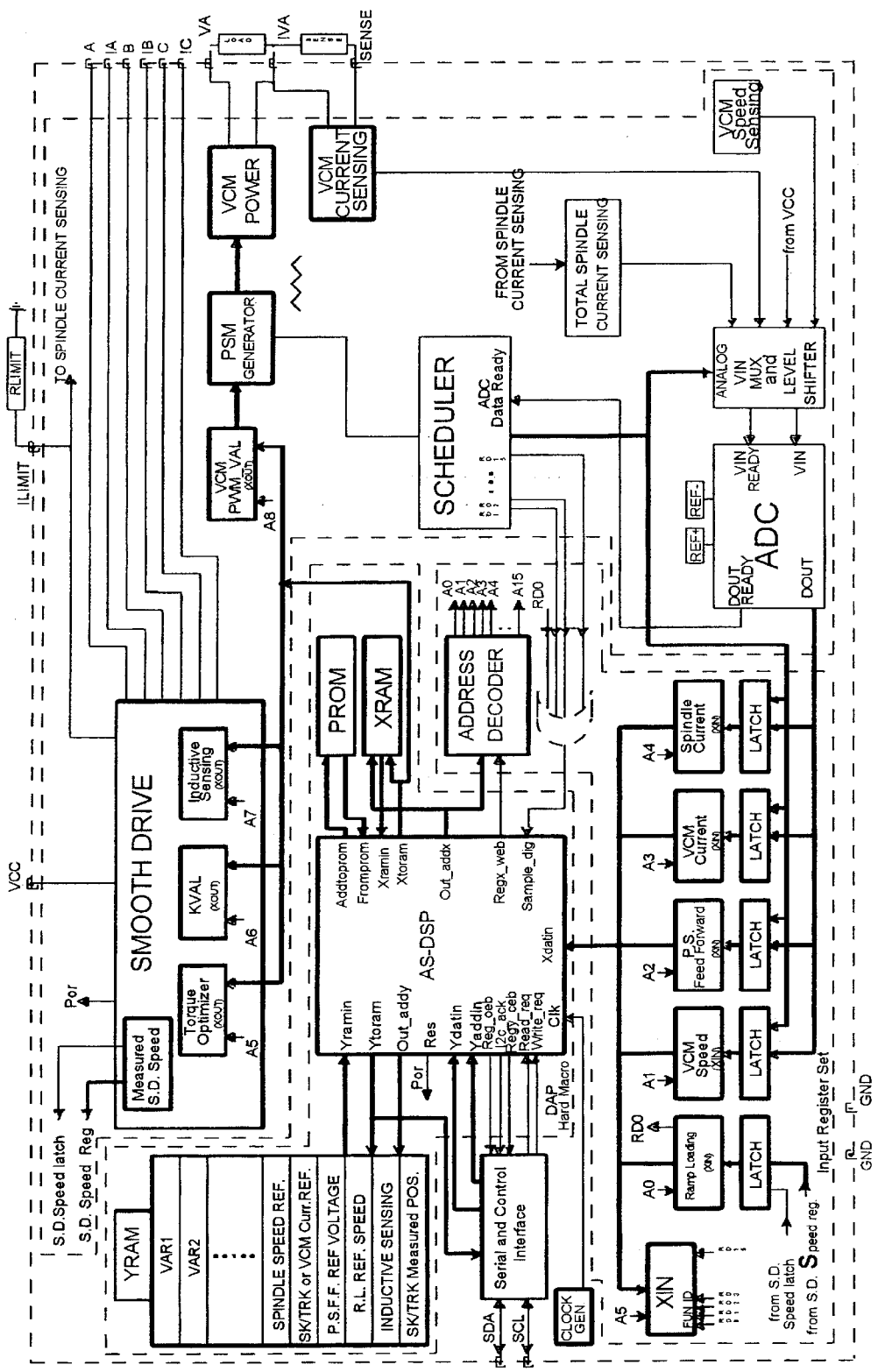
FIG. 10 is a high level block diagram of the IC according to the present invention.
Figure 11:
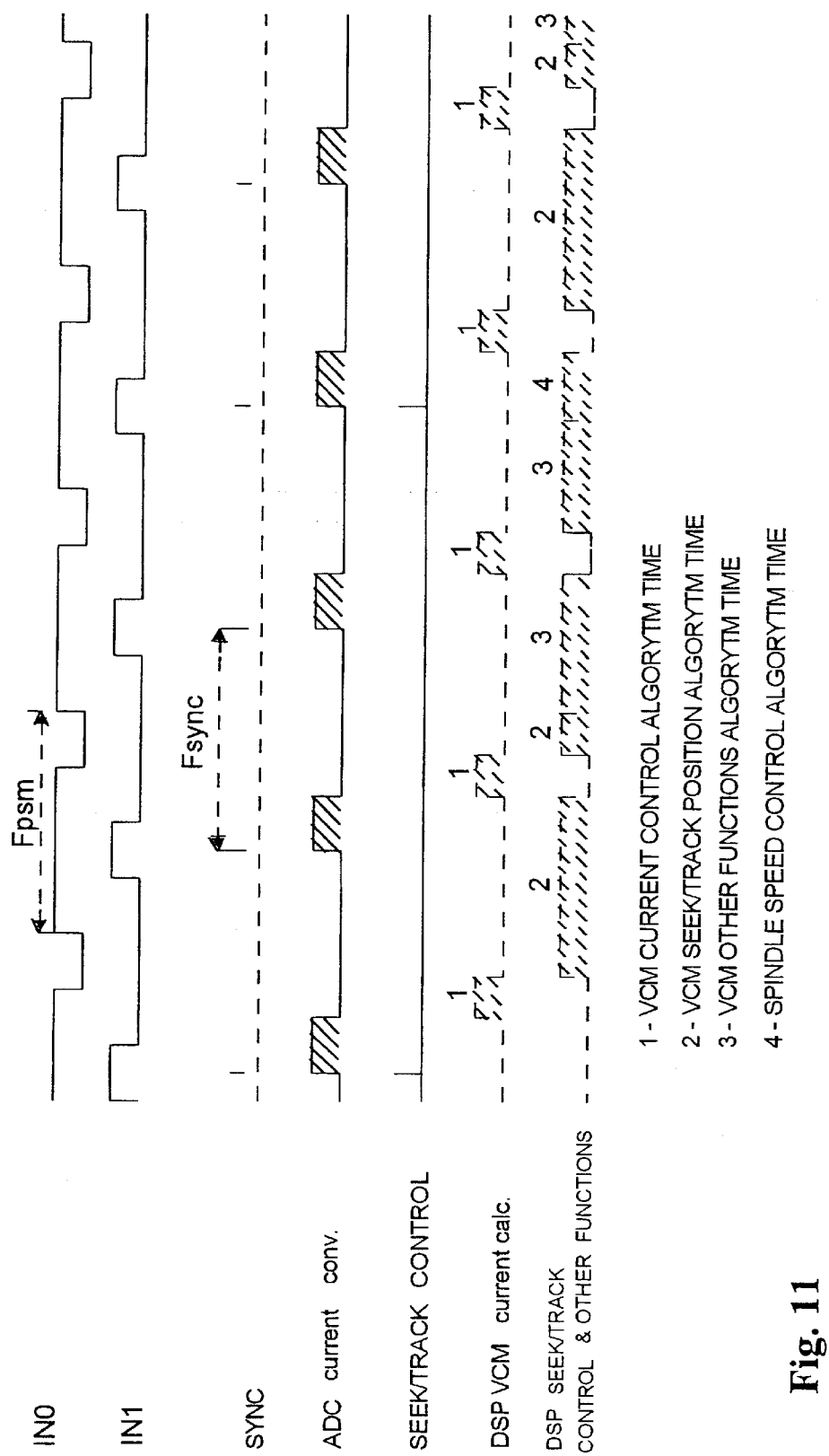
FIG. 11 shows how the execution of different functions can be split according to the present invention.
Figure 12:
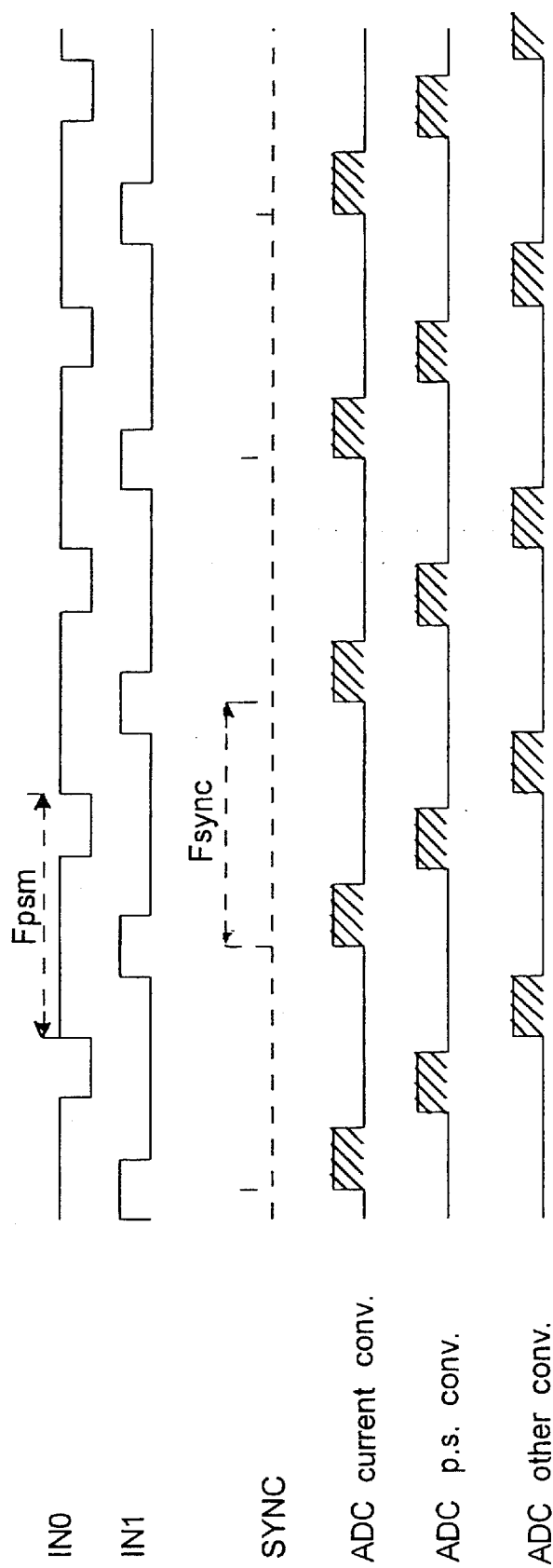
FIG. 12 shows how the single A/D converter of the IC supports the conversion of different signals in a time-sharing mode according to the present invention.

A diagram of the whole integrated circuit of the invention is depicted in FIG. 10. The regulation of the speed of rotation of the multiphase brushless motor, which in the depicted example is a three-phase motor, is implemented by the fully digital block SMOOTH DRIVE.

The register KVAL is written directly by the DSP with the new value calculated using a prearranged proportional-integral control function (PI). The other two registers, TORQUE OPTIMIZER and INDUCTIVE SENSING, have the function already discussed above in relation to the known technique. A possible time interleaving of the speed control algorithm of the motor rotating the disk run every 1 ms is depicted in FIG. 9 (a correspondence of zone 4).

A further function that can be implemented by the DSP is that of ensuring a high PSRR of the control structure for the rotation speed of the motor, SMOOTH DRIVE. In fact, when the driving of the motor is carried out in a voltage mode and has the regulation loop as a relatively narrow bandwidth (few hertz), it may happen that a noise of relatively high frequency on the supply rail (for example, $\geq 5$ Hz) cannot be recovered by the control loop for the speed of the motor, and thus affect the drive current of the motor with a consequent speed jitter.

As depicted in the diagram of FIG. 10, a compensation circuit for noise coming from the supply rails may be realized by a feed forward technique. The supply voltage is monitored and converted to digital form by using the same analog/digital converter ADC used for converting the information about the current flowing through the winding of the voice coil motor.

Indeed, the 4 $\mu$s conversion time of the ADC converter allows the carrying out of the conversion of the information about the current, and about the supply voltage as well as other functions in a time sharing mode, as depicted in FIG.

12. The digital value of the supply is stored in a register, ready to be used as a new reference value for the feed forward algorithm, as depicted in the diagram of FIG. 10.

The feed forward algorithm modulates the value of the register KVAL of the block SMOOTH DRIVE that controls the rotational speed of the disk. The content of this register controls the speed of the multiphase motor that rotates the disk. By indicating the voltage across the terminals of the motor as VOUT, the duty cycle determined by the conversion block PSM as DC, and the supply voltage as $V_P$, then:

$$V_{OUT}=DC*V_P$$

This means that in order to keep constant Vout while Vp varies, the feed forward algorithm must force an opposite variation of the same percentage of duty cycle DC. This is achieved by modulating in an appropriate manner the content of the KVAL register.

Another important function carried out by the DSP is ramp loading, i.e., the swinging of the arm carrying the head off the disk surface to a parking ramp and the reverse operation of ramp unloading, i.e. of releasing the arm and swinging it over the disk surface. During ramp loading all other functions are stopped. In these conditions, the reference input of the loop that controls the drive current flowing in the voice coil motor does not come from the control loop of the arm position, but is provided by the ramp loading algorithm.

Instead of the position control algorithm, the DSP now dedicates the available time to the speed control algorithm of the voice coil motor. The ramp loading is completed in steps interleaved to periods dedicated to the control of the drive current in the voice coil motor. When the head is moved again from the parking position over the disk surface, the position control algorithm is reactivated.

The DSP can also provide for the possibility of running a robust active damping algorithm for vibrations induced by external shocks. Optionally, a signal derived from an impact sensor can be used to modulate the reference signal of the control loop of the current in the voice coil motor.

An advantage offered by the presence of an on board DPS is the possibility of implementing a most effective strategy of energy consumption reduction. During long periods of inactivity, the DSP can decide which of the blocks may be completely turned off, and which minimal activity must be maintained to ensure a prompt recovery to full functionality.

For example, during long periods of inactivity the DSP may reduce the rotation speed of the disk thus reducing power dissipation while keeping a minimum speed of rotation. This is done so the motor can immediately accelerate, thus avoiding the running of a time consuming and relatively complex start-up procedure.

While driving the motor in voltage mode, the currents flowing through the phase windings are phase shifted a certain electrical angle (δ) from the drive voltages, proportional to the frequency of the voltage signals applied to the windings of the motor.

On the other side, the most efficient condition of driving the motor is for the current through the windings to be in phase with the back electromotive force induced on the windings. In these conditions, the ripple of the produced torque is minimum, the available average torque is maximum and therefore the current absorbed at a certain rotation speed corresponds to the minimum value. In these conditions, the motor is driven at maximum efficiency and the current absorbed from the supply rails is fully converted to torque.

This optimal condition of perfect phase alignment between the back electromotive force induced on the windings and the drive current forced through them should be kept in all the operating conditions of the motor, i.e., when accelerating and decelerating in addition to running at a constant speed.

Figure 13:
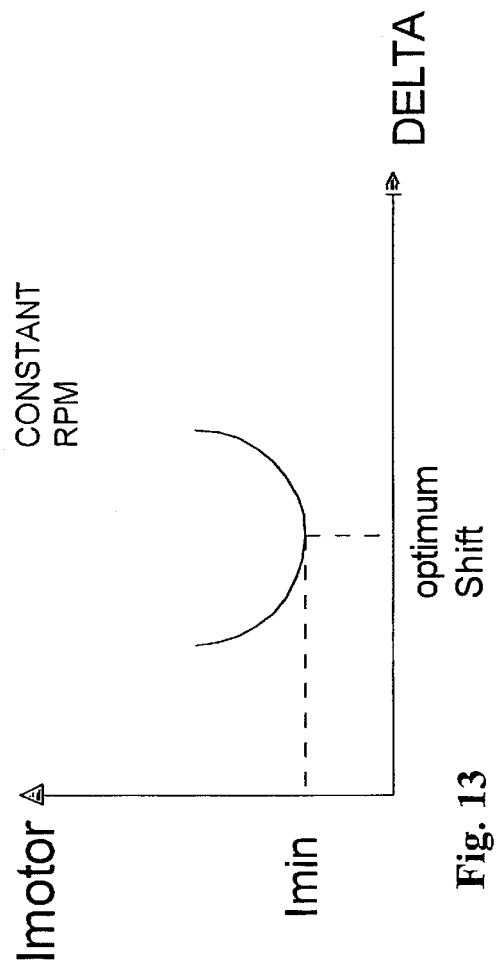
FIG. 13 defines the optimal phase shift to ensure the maximum efficiency in driving in a voltage mode the motor that rotates the disk according to the present invention.

Because the back electromotive force is strictly related to the position of the rotor, it can be usefully exploited to generate a synchronization signal, ZC, according to a technique well known to one skilled in the art. For example, the signal ZC may be a pulse that is generated every time the signal BEMF reaches a certain pre-established level. Thus, it is possible to synchronize the application of driving voltages to the windings of the motor with a certain delay with respect to the signal ZC to force the currents in the respective windings perfectly in phase with the BEMF, as illustrated in FIG. 13.

Figure 14:
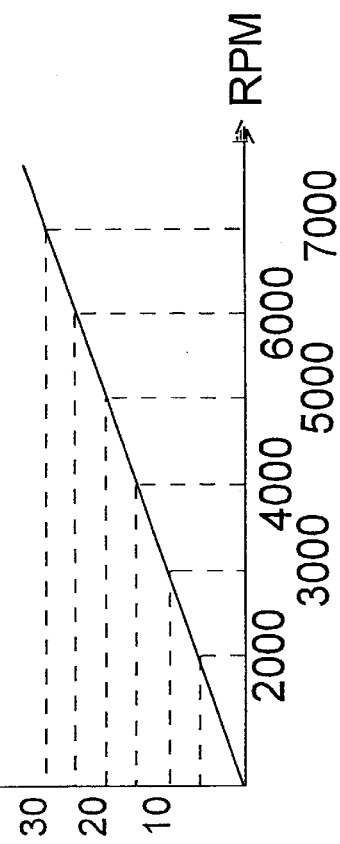
FIG. 14 shows a possible splitting of the phase shift as a function of increments of the rotation speed of the motor according to the present invention.

To achieve this, it is possible to map the values of the phase delay d as a function of the speed of rotation of the motor, accounting for the actual electrical characteristics of the motor, as depicted in FIG. 14. The characteristic of the phase shift δ as a function of the rotation speed of the motor can be divided into a certain number of segments, as depicted in FIG. 14, without substantially losing effectiveness.

The DSP can then force in the register TORQUE OPTIMIZER of the control block SMOOTH DRIVE a certain phase shift δ according to a pre-mapping of the different speed zones of the characteristic carried out during a trimming process. Finally, the DSP may also supervise the execution of diagnostic functions of the IC by activating prearranged routines whenever an operating problem develops.

That which is claimed is:

1. A device for driving and controlling a rotation motor and a voice coil motor for a disk drive, the device comprising:

a digital signal processor (DSP) functioning in a time sharing mode for carrying a plurality of functions;

a bank of input/output registers connected to said DSP;

a rotation motor circuit for controlling and driving the rotation motor for rotating a disk of the disk drive;

a voice coil motor output stage for driving the voice coil motor for positioning a swinging arm of the disk drive with respect to the disk, said voice coil motor output stage being controlled in a switched mode based upon two control phases having a variable duty-cycle;

a duty-cycle control loop comprising a current sensing circuit connected to the voice coil motor;

an arm position control loop comprising a speed detection circuit connected to the voice coil motor;

said duty-cycle control loop and said arm position control loop being digitally implemented by said DSP as a function of digital data representing a first analog signal generated by said current sensing circuit representative of current conducting in a winding of the voice coil motor, and a second analog signal generated by said speed detection circuit representative of a speed of the voice coil motor;

a multiplexer for selecting among the first and second analog signals and a third analog signal representative of a drive current of the rotation motor; and an analog/digital converter functionally coupled in cascade to an output of said multiplexer for providing the digital data to respective registers of said bank of input/output registers.

2. A device according to claim 1, wherein said DSP implements said duty-cycle control loop and said arm position control loop by interlacingly running respective algorithms associated therewith in a time sharing mode.

3. A device according to claim 1, further comprising a memory connected to said DSP.

4. A device according to claim 1, wherein the speed is an instantaneous speed.

5. A device according to claim 1, wherein the rotation motor is a multiphase motor.

6. A device according to claim 1, further comprising a memory address decoding circuit connected to said DSP.

7. A device according to claim 1, further comprising a timing circuit connected to said DSP.

8. A device according to claim 1, further comprising a generator connected to said voice coil motor output stage for providing the two control phases.

9. A device according to claim 1, further comprising an interface connected to said DSP for communicating with an external controller.

10. A device for driving and controlling a rotation motor and a voice coil motor for a disk drive, the device comprising:
    a digital signal processor (DSP) functioning in a time sharing mode;
    a rotation motor circuit for controlling and driving the rotation motor for rotating a disk;
    a voice coil motor output stage for driving the voice coil motor for positioning a swinging arm with respect to the disk, said voice coil motor output stage being controlled in a switched mode based upon two control phases having a variable duty-cycle;
    a duty-cycle control loop comprising a sensing circuit connected to the voice coil motor;
    an arm position control loop comprising a detection circuit connected to the voice coil motor;
    said duty-cycle control loop and said arm position control loop being digitally implemented by said DSP as a function of digital data representing a first analog signal generated by said sensing circuit and a second analog signal generated by said detection circuit; and
    an analog/digital converter for receiving the first and second analog signals for providing the digital data to said DSP.

11. A device according to claim 10, further comprising a multiplexer having respective inputs connected to said sensing circuit for receiving the first analog signal and connected to said detection circuit for receiving the second analog signal, and an output connected to said analog/digital converter.

12. A device according to claim 10, wherein said sensing circuit senses current conducting in a winding of the voice coil motor.

13. A device according to claim 10, wherein said detection circuit detects a speed of the voice coil motor.

14. A device according to claim 10, wherein said analog/digital converter further receives a third analog signal representative of a drive current of the rotation motor, and wherein the digital data further represents the third analog signal.

15. A device according to claim 10, further comprising a bank of input/output registers for receiving the digital data and for providing the digital data to said DSP.

16. A device according to claim 10, wherein said DSP implements said duty-cycle control loop and said arm position control loop by interlacingly running respective algorithms associated therewith in a time sharing mode.

17. A device according to claim 10, further comprising a memory connected to said DSP.

18. A device according to claim 10, wherein the rotation motor is a multiphase motor.

19. A device according to claim 10, further comprising a generator connected to said voice coil motor output stage for providing the two control phases.

20. A device according to claim 10, further comprising an interface connected to said DSP for communicating with an external controller.

21. A disk drive comprising:
    a rotating disk;
    a rotation motor for rotating said disk;
    a swinging arm comprising a read/write head carried by a free end thereof;
    a voice coil motor connected to said arm for positioning the free end thereof with respect to said disk; and
    a device for driving and controlling said rotation motor and said voice coil motor, the device comprising
        a digital signal processor (DSP) functioning in a time sharing mode,
        a rotation motor circuit for controlling and driving said rotation motor,
        a voice coil motor output stage for driving said voice coil motor and being controlled in a switched mode based upon two control phases having a variable duty-cycle,
        a duty-cycle control loop comprising a sensing circuit connected to said voice coil motor,
        an arm position control loop comprising a detection circuit connected to said voice coil motor,
        said duty-cycle control loop and said arm position control loop being digitally implemented by said DSP as a function of digital data representing a first analog signal generated by said sensing circuit and a second analog signal generated by said detection circuit, and
        an analog/digital converter for receiving the first and second analog signals for providing the digital data to said DSP.

22. A disk drive according to claim 21, further comprising a multiplexer having respective inputs connected to said sensing circuit for receiving the first analog signal and said detection circuit for receiving the second analog signal, and an output connected to said analog/digital converter.

23. A disk drive according to claim 21, wherein said sensing circuit senses current conducting in a winding of the voice coil motor.

24. A disk drive according to claim 21, wherein said detection circuit detects a speed of the voice coil motor.

25. A disk drive according to claim 21, wherein said analog/digital converter further receives a third analog signal representative of a drive current of the rotation motor, and wherein the digital data further represents the third analog signal.

26. A disk drive according to claim 21, further comprising a bank of input/output registers for receiving the digital data and for providing the digital data to said DSP.

27. A disk drive according to claim 21, wherein said DSP implements said duty-cycle control loop and said arm position control loop by interlacingly running respective algorithms associated therewith in a time sharing mode.

28. A disk drive according to claim 21, wherein said device further comprises a memory connected to said DSP.

29. A disk drive according to claim 21, wherein the rotation motor is a multiphase motor.

30. A disk drive according to claim 21, wherein said device further comprises a generator connected to said voice coil motor output stage for providing the two control phases.

31. A disk drive according to claim 21, wherein said device further comprises an interface connected to said DSP for communicating with an external controller.

32. A method for driving and controlling a rotation motor and a voice coil motor for a disk drive, the method comprising:
- operating a digital signal processor (DSP) in a time sharing mode;
- controlling the voice coil motor in a switched mode based upon two control phases having a variable duty-cycle;
- generating a first analog signal based upon a duty-cycle control loop comprising a sensing circuit connected to the voice coil motor;
- generating a second analog signal based upon an arm position control loop comprising a detection circuit connected to the voice coil motor; and
- digitally implementing the duty-cycle control loop and the arm position control loop by the DSP as a function of digital data representing the first and second analog signals.

33. A method according to claim 32, further comprising converting the first and second analog signals to the digital data.

34. A method according to claim 33, further comprising multiplexing the first and second analog signals before they are converted to the digital data.

35. A method according to claim 32, wherein the sensing circuit senses current conducting in a winding of the voice coil motor.

36. A method according to claim 32, wherein the detection circuit detects a speed of the voice coil motor.

37. A method according to claim 32, further comprising generating a third analog signal representative of a drive current of the rotation motor, and wherein the digital data further represents the third analog signal.

38. A method according to claim 32, wherein the digital data is provided to the DSP via a bank of input/output registers connected thereto.

39. A method according to claim 32, wherein the DSP implements the duty-cycle control loop and the arm position control loop by interlacingly running respective algorithms associated therewith in a time sharing mode.

* * * * *

UNITED STATES PATENT AND TRADEMARK OFFICE
CERTIFICATE OF CORRECTION

PATENT NO. : 6,566,838 B2
DATED : May 20, 2003
INVENTOR(S) : Maiocchi

It is certified that error appears in the above-identified patent and that said Letters Patent is hereby corrected as shown below:

Column 1,
Line 57, delete "control" insert -- controls --

Column 2,
Lines 52-54, delete "The invention is more precisely defined in the attached claim 1 and a particularly effective embodiment is defined in dependent claim 2."

Insert -- More particularly, the device is for driving and controlling a rotation motor and a voice coil motor for a hard disk drive system comprising a disk and an arm carrying a read/write head to be positioned with respect thereto. The device may comprise a digital signal processor functioning in a time sharing mode for performing a plurality of functions, a bank of input/output registers connected to the DSP, a rotation motor circuit for controlling and driving the rotation motor for rotating the disk, and a voice coil motor output stage for driving the voice coil motor for positioning the arm with respect to the disk.
The voice coil motor output stage is preferably controlled in a switched mode based upon two control phases of variable duty-cycles.
A duty-cycle control loop comprising a current sensing circuit is preferably connected to the voice coil motor, and an arm position control loop comprising a speed detection circuit is preferably connected to the voice coil motor.
    The duty-cycle control loop and the arm position control loop may be digitally implemented by the DSP as a function of digital data representing a first analog signal generated by the current sensing circuit representative of current conducting in a winding of the voice coil motor, and a second analog signal generated by the speed detection circuit representative of an instant speed of the voice coil motor.
    The device may further include a multiplexer for selecting among the first and second analog signals and a third analog signal representative of a drive current of the rotation motor. An analog/digital converter may be functionally coupled in cascade to an output of the multiplexer for providing the digital data to respective registers of the bank of input/output registers.
    The DSP may implement the duty-cycle control loop and the arm position control loop by interlacingly running respective algorithms associated therewith in a time sharing mode. The device preferably further comprises an interface connected to the DSP for communicating with an external controller. --

UNITED STATES PATENT AND TRADEMARK OFFICE
CERTIFICATE OF CORRECTION

PATENT NO.    : 6,566,838 B2
DATED         : May 20, 2003
INVENTOR(S)   : Maiocchi It is certified that error appears in the above-identified patent and that said Letters Patent is hereby corrected as shown below:

Column 3,
Line 65, delete "ILOAD" insert -- LOAD --

Column 4,
Line 40, delete "purposes." insert -- purpose. --
Line 59, delete "out"

Column 5,
Line 28, delete "resources" insert -- resource --

Column 6,
Line 3, delete "at"

Column 7,
Line 9, insert -- DC is -- between "cycle" and "determined"
Line 10, insert -- is indicated -- between "voltage" and "as"
Line 14, insert -- the -- between "of" and "duty"
Line 51, insert -- a -- between "in" and "voltage"

Signed and Sealed this

Twenty-eighth Day of October, 2003

JAMES E. ROGAN
*Director of the United States Patent and Trademark Office*